US012400776B2

(12) United States Patent
Nakahata et al.

(10) Patent No.: US 12,400,776 B2
(45) Date of Patent: Aug. 26, 2025

(54) MAGNETIC CORE AND METHOD FOR MANUFACTURING SAME, AND COIL COMPONENT

(71) Applicant: TDK CORPORATION, Tokyo (JP)

(72) Inventors: Isao Nakahata, Tokyo (JP); Hiroyuki Matsumoto, Tokyo (JP); Osamu Hirose, Tokyo (JP)

(73) Assignee: TDK CORPORATION, Tokyo (JP)

( * ) Notice: Subject to any disclaimer, the term of this patent is extended or adjusted under 35 U.S.C. 154(b) by 795 days.

(21) Appl. No.: 16/967,934

(22) PCT Filed: Mar. 1, 2019

(86) PCT No.: PCT/JP2019/008125
§ 371 (c)(1),
(2) Date: Aug. 6, 2020

(87) PCT Pub. No.: WO2019/168158
PCT Pub. Date: Sep. 6, 2019

(65) Prior Publication Data

US 2021/0035726 A1 Feb. 4, 2021

(30) Foreign Application Priority Data

Mar. 2, 2018 (JP) ................................ 2018-037526
Aug. 27, 2018 (JP) ................................ 2018-158585

(51) Int. Cl.
*H01F 27/25* (2006.01)
*H01F 1/153* (2006.01)
(Continued)

(52) U.S. Cl.
CPC ..... *H01F 1/15308* (2013.01); *H01F 1/15333* (2013.01); *H01F 27/25* (2013.01);
(Continued)

(58) Field of Classification Search
CPC .. H01F 1/15308; H01F 1/15333; H01F 27/25; H01F 27/28; H01F 41/0213; H01F 41/0226; H01F 1/15375; H01F 3/04
See application file for complete search history.

(56) References Cited

U.S. PATENT DOCUMENTS

2014/0191832 A1 7/2014 Ohta et al.
2014/0362505 A1 12/2014 Jang et al.
(Continued)

FOREIGN PATENT DOCUMENTS

CN 103748250 A 4/2014
CN 104054409 A 9/2014
(Continued)

OTHER PUBLICATIONS

May 21, 2019 Search Report issued in International Patent Application No. PCT/JP2019/008125.
(Continued)

*Primary Examiner* — Tuyen T Nguyen
(74) *Attorney, Agent, or Firm* — Oliff PLC

(57) ABSTRACT

A magnetic core excellent in productivity, having stable magnetic characteristics, and easy to handle for a coil device including a conductor and is formed by stacking a plurality of soft magnetic thin ribbons divided into small pieces.

4 Claims, 6 Drawing Sheets

(51) Int. Cl.
*H01F 27/28* (2006.01)
*H01F 41/02* (2006.01)

(52) U.S. Cl.
CPC ......... *H01F 27/28* (2013.01); *H01F 41/0213* (2013.01); *H01F 41/0226* (2013.01); *Y10T 428/32* (2015.01)

(56) References Cited

U.S. PATENT DOCUMENTS

| | | | | |
|---|---|---|---|---|
| 2015/0050510 | A1* | 2/2015 | Motegi et al. | |
| 2015/0123604 | A1 | 5/2015 | Lee et al. | |
| 2016/0081237 | A1 | 3/2016 | Lee et al. | |
| 2016/0081238 | A1 | 3/2016 | Lee et al. | |
| 2016/0081239 | A1 | 3/2016 | Lee et al. | |
| 2016/0081240 | A1 | 3/2016 | Lee et al. | |
| 2016/0345474 | A1* | 11/2016 | Oh | H04B 5/79 |
| 2018/0240582 | A1* | 8/2018 | Cho | H01F 27/366 |
| 2019/0045676 | A1 | 2/2019 | Lee et al. | |
| 2022/0279687 | A1* | 9/2022 | Lee | H02J 50/12 |

FOREIGN PATENT DOCUMENTS

| | | | | |
|---|---|---|---|---|
| CN | 104900383 | A | | 9/2015 |
| JP | 05258950 | A | * | 10/1993 |
| JP | H05-335154 | A | | 12/1993 |
| JP | H11-74108 | A | | 3/1999 |
| JP | 3772778 | B2 | * | 5/2006 |
| JP | 2008-112830 | A | | 5/2008 |
| JP | 2011-134959 | A | | 7/2011 |
| JP | 2013-046032 | A | | 3/2013 |
| JP | 2015-505166 | A | | 2/2015 |
| JP | 2015-228713 | A | | 12/2015 |
| JP | 2018-049921 | A | | 3/2018 |
| KR | 20170040031 | A | * | 4/2017 |

OTHER PUBLICATIONS

Sep. 8, 2020 International Preliminary Report on Patentability issued in International Patent Application No. PCT/JP2019/008125.
May 21, 2019 Search Report issued in International Patent Application No. PCT/JP2019/008126.
Sep. 8, 2020 International Preliminary Report on Patentability issued in International Patent Application No. PCT/JP2019/008126.
U.S. Appl. No. 16/977,738, filed Sep. 2, 2020 in the name of Isao Nakahata et al.
Jan. 13, 2025 Office Action issued in U.S. Appl. No. 16/977,738.
Apr. 10, 2024 Office Action issued in U.S. Appl. No. 16/977,738.

* cited by examiner

MAGNETIC CORE AND METHOD FOR MANUFACTURING SAME, AND COIL COMPONENT

FIELD OF THE INVENTION

The present invention relates to a magnetic core, a method of manufacturing the same, and a coil device.

RELATED ART

In accordance with the recent miniaturization of power devices, further miniaturization of transformers and coils, which occupy a lot of space in the power devices, is desired. In general, ferrite is often used as a material for magnetic cores for transformers and coils.

In miniaturizing transformers, coils, etc., it is necessary to increase the maximum magnetic flux density during driving, but the saturation magnetic flux density of ferrite is not very large, and there is a limit to the miniaturization of transformers, coils, etc. using ferrite as it is. Examples of a material having a high saturation magnetic flux density include soft magnetic metal materials, such as Fe—Si type materials, amorphous type materials, metallic glass type materials, and nanocrystalline type materials (for example, see Patent Document 1). Examples of a magnetic core using a soft magnetic metal material include a dust core formed by pressing a powder of a soft magnetic metal material, a winding core formed by winding a ribbon of a soft magnetic metal material into a ring shape or so, and a multilayer core formed by laminating ribbons of a soft magnetic metal material. For miniaturization of the magnetic cores, it is necessary to fill a limited volume of the core with a magnetic material having a high saturation magnetic flux density at a high space factor.

The dust core is molded by filling a metal soft magnetic powder into a mold and applying pressure thereto, but the pressure is required to be high for increasing the space factor of the dust core. In particular, powders of Fe type amorphous material, metallic glass type material, nanocrystalline type material, etc. are hard, and a very high pressure is required for molding the powders. There is a problem that the cost for manufacturing a dust core with a high space factor using the powders is very high.

The winding core is manufactured by winding a metal soft magnetic ribbon processed to have desired length and width. In this method, a core with a comparatively high space factor is obtained, but the core shape is limited to one that can be handled by winding. In general, a heat treatment is performed to remove the processing strain of the amorphous type magnetic ribbon or to deposit microcrystals in the nanocrystalline type magnetic ribbon. Due to the heat treatment, the magnetic ribbon becomes very brittle though the magnetic characteristics are improved, and in particular, when the magnetic ribbon constitutes a winding core, there is a problem that the winding core is easily broken and difficult to handle.

As other cores, there is a multilayer core manufactured by punching a plurality of magnetic ribbons and laminating them in the thickness direction. The multilayer core also has a high space factor as with the winding core and has a comparatively high degree of freedom in shape compared to the winding core. In addition to magnetic components for power devices, the multilayer core is also used for rotors, stators, etc. of motors. However, there is a problem that metal ribbons, particularly amorphous type and nanocrystalline type magnetic ribbons before heat treatment, are difficult to be punched into a desired shape due to their hardness, and that the punching die is heavily consumed. In addition, it is necessary to perform a heat treatment to recover the deterioration of the magnetic characteristics generated on a cut surface of the magnetic ribbon due to the stress applied at the time of punching, but there is a problem that the magnetic ribbon becomes fragile due to the heat treatment as mentioned above and is thereby difficult to handle.

PRIOR ART

Patent Document

Patent Document 1: JPH1174108 (A)

SUMMARY OF THE INVENTION

Problem to be Solved by the Invention

The present invention has been achieved under such circumstances. It is an object of the invention to provide a magnetic core having excellent productivity and stable magnetic characteristics and being easy to handle, a method of manufacturing the magnetic core, and a coil device including the magnetic core.

Means for Solving the Problem

To achieve the above object, the present invention provides the following means.

(1) A magnetic core according to an aspect of the present invention is for a coil device including a conductor and includes laminated soft magnetic ribbons which are fragmented.

(2) In the magnetic core according to (1), preferably, the soft magnetic ribbons are fragmented so as to have an average crack interval of 0.015 mm or more and 1 mm or less.

(3) In the magnetic core according to (1) or (2), preferably, a space factor of a magnetic material is 70% or more and 99.5% or less.

(4) A coil device according to an aspect of the present invention is formed by the magnetic core according to any of (1)-(3) wound by a coil.

(5) A method of manufacturing a magnetic core according to an aspect of the present invention is a method of manufacturing the magnetic core according to any of (1)-(3), including the steps of: heating a plurality of soft magnetic ribbons; forming an adhesive layer on a main surface of each of the heated soft magnetic ribbons; fragmenting each of the soft magnetic ribbons on which the adhesive layer is formed; punching each of the fragmented soft magnetic ribbons into a predetermined shape; and laminating the fragmented soft magnetic ribbons via the adhesive layer in a thickness direction.

Effects of the Invention

The soft magnetic ribbons constituting the magnetic core of the present invention are made of a hard material, but are each divided into a plurality of small pieces and can be punched with a weaker force than when not divided. Therefore, the magnetic core of the present invention can be easily processed into a desired shape and is excellent in productivity.

In general, when a soft magnetic ribbon is punched, a stress is generated by cutting a punched portion and a remaining portion, and the stress is transmitted to the remaining portion of the soft magnetic ribbon to deteriorate the magnetic characteristics. However, each of the soft magnetic ribbons of the present invention is fragmented and has a physical distance between the portion near the cut surface where the stress is generated and the other portion. Thus, the stress is not transmitted to most part other than the portion near the cut surface, and the damage caused by the stress can be minimized. Thus, the soft magnetic ribbons of the present invention are stable magnetic characteristics without being affected by punching.

The magnetic core of the present invention has a structure in which the space factor of the magnetic material is increased by laminating a plurality of soft magnetic ribbons via a thin adhesive layer and is strong and easy to handle.

Since the magnetic core of the present invention is formed by laminating a plurality of soft magnetic ribbons, the current path is divided at a plurality of locations in the lamination direction. In the magnetic core according to the present invention, since each of the soft magnetic ribbons is fragmented, the current path is also divided at a plurality of locations in a direction intersecting the lamination direction. Therefore, in the coil device according to the present invention, the eddy current path accompanying the change of the magnetic flux in the alternating magnetic field is divided in all directions, and the eddy current loss can be greatly reduced.

EMBODIMENTS FOR CARRYING OUT THE INVENTION

Hereinafter, the present invention is explained in detail with appropriate reference to the figures. In the figures used in the following explanation, characterized pars may appropriately be enlarged for easy understanding of the characteristics of the present invention, and for example, the dimensional ratio of constituents may be different from actual one. The materials, dimensions, and the like exemplified in the following explanation are merely examples, and the present invention is not limited to them and can be implemented with appropriate modifications within the scope of the effects of the present invention.

[Coil Device]

Figure 1:
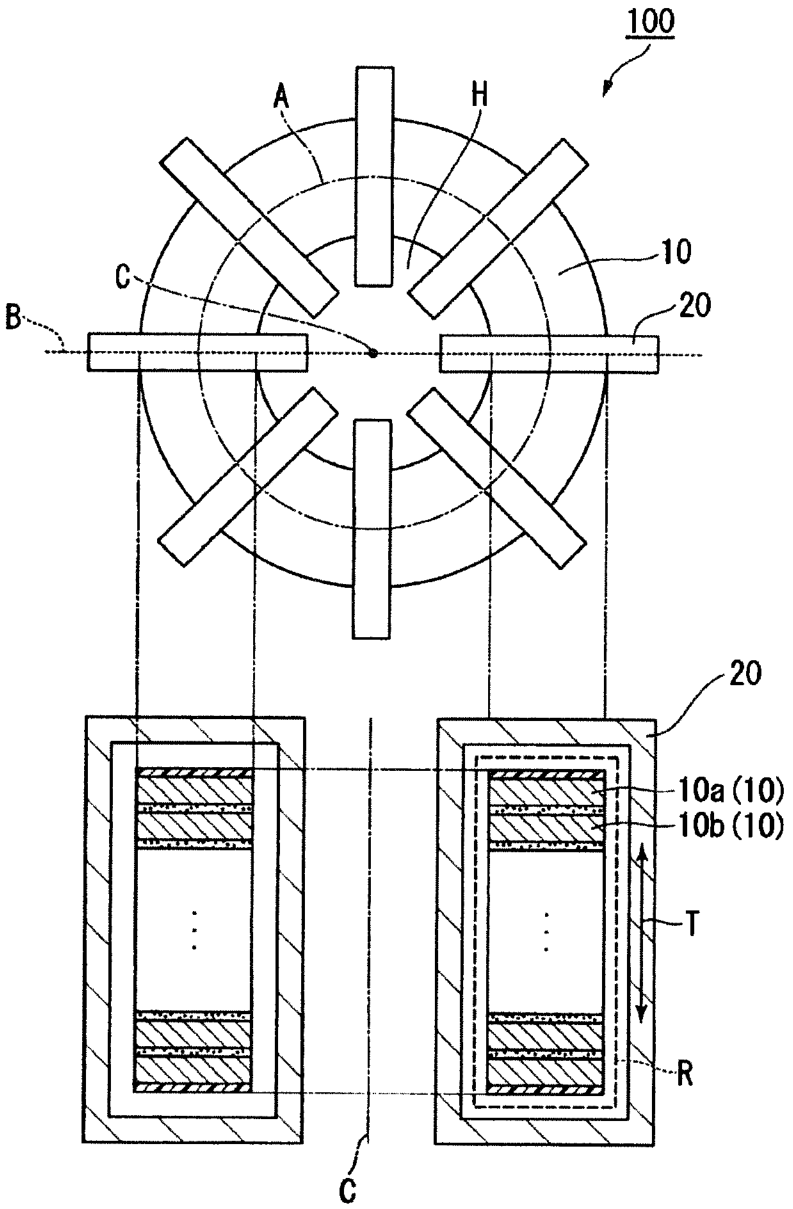
FIG. 1 is a plane view (upper side) and a cross-sectional view (lower side) of a coil device according to an embodiment of the present invention.

Explained are configurations of a magnetic core 10 and a coil device 100 according to an embodiment of the present invention. The upper side of FIG. 1 is a plane view of the coil device 100 viewed from one side where a central axis C of the cylindrical magnetic core 10 is extended. The lower side of FIG. 1 is a cross-sectional view of the coil device 100 cut along a plane B including the central axis C. The back of the cross section is not illustrated.

The magnetic core 10 is used for coil devices including a conductor (transformers, choke coils, magnetic sensors, etc.) and is formed by laminating a plurality of soft magnetic ribbons 10*a*, 10*b*, . . . divided into small pieces. In the coil device 100 shown here, a coil 20 having a spiral shape etc. is wound around the magnetic core 10. The shape, size, number, and the like of the coil 20 are changeable according to the application of the coil device 100. An integrated magnetic core having a through hole as shown in FIG. 1 may be used, or a magnetic core in which a through hole is formed by combining a plurality of members as shown in Modified Example 3 mentioned below may be used.

[Magnetic Core]

Figure 2:
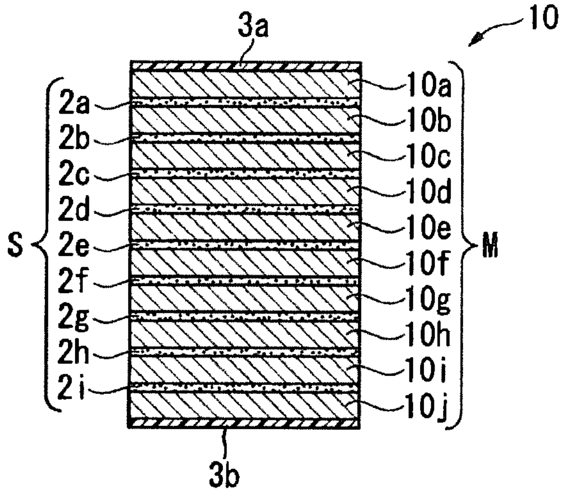
FIG. 2 is a schematic view of a cross section of a magnetic core constituting the coil device of FIG. 1.

FIG. 2 is an enlarged view of a portion included in a region R surrounded by the dotted line in the cross section of the magnetic core 10 shown in FIG. 1 and illustrates a specific structure of the portion. The magnetic core 10 is formed from a plurality of soft magnetic ribbons M (10*a*-10*j*) laminated in the thickness direction and adhesive layers S (2*a*-2*i*) sandwiched between the soft magnetic ribbons next to each other. The magnetic core 10 may include protective films 3*a* and 3*b* on one end and the other end in the lamination direction. As with normal magnetic cores, the magnetic core of the present invention includes the soft magnetic ribbons and the adhesive layers for the magnetic core as main members, but may include other components as long as the effects of the present invention are demonstrated.

Since the magnetic core 10 includes the adhesive layers S, it is possible to reduce the falling of the small pieces after the division. The adhesive layers S can be made of known materials, such as a base body of PET film coated with an acrylic type adhesive, an adhesive made of silicone resin, butadiene resin, etc., hot melt, or the like. In addition to the PET film, the base body may be a resin film, such as a polyimide film, a polyester film, a polyphenylene sulfide (PPS) film, a polypropylene (PP) film, and a fluororesin film like polytetrafluoroethylene (PTFE). Moreover, the adhesive layers may be an acrylic resin etc. directly applied onto a main surface of the soft magnetic ribbon after heat treatment.

FIG. 2 illustrates the case where the magnetic core 10 is provided with a plurality of soft magnetic ribbons, but the number of soft magnetic ribbons to be provided may be one. When the magnetic core of the present invention is provided with a plurality of soft magnetic ribbons, the effect is greatest when all are the soft magnetic ribbons for the magnetic core of the present invention.

The magnetic core of the present invention can be manufactured by a known method.

[Soft Magnetic Ribbon]

Each of the soft magnetic ribbons 10 has a plurality of cracks and is divided into a plurality of small pieces by the cracks. In the present specification, when a line segment is drawn in an area divided and fragmented by the cracks, the number of cracks intersecting the line segment divided by the length of the line segment is defined as an "average crack interval".

Figure 3:
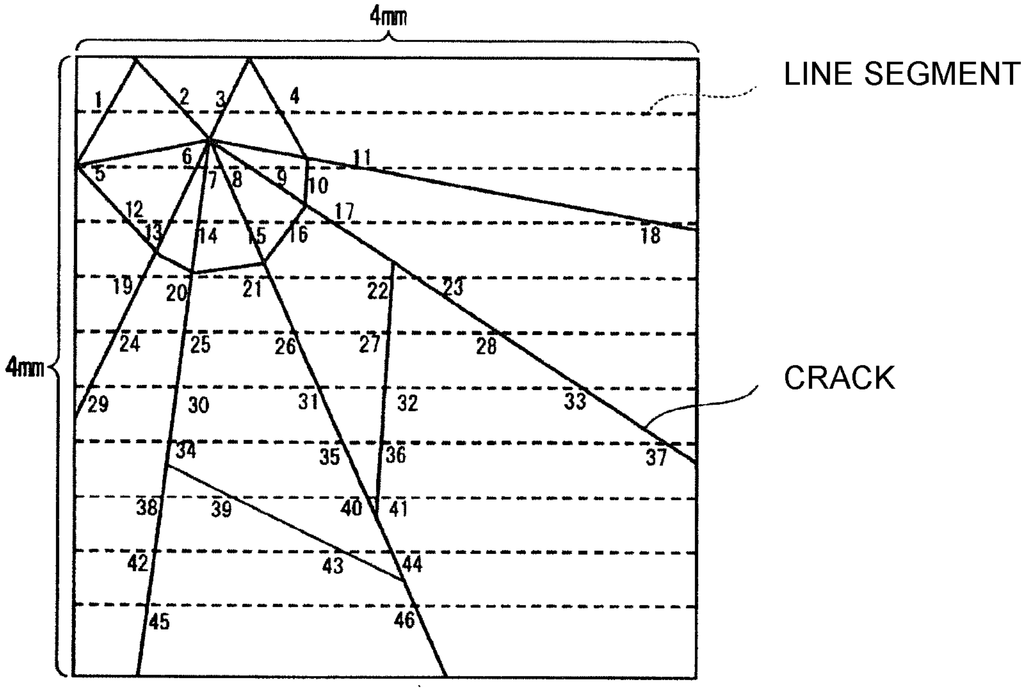
FIG. 3 is a view for explaining how to calculate an "average crack interval".

A method of calculating an "average crack interval" is explained with reference to a specific case shown in FIG. 3. The numbers in FIG. 3 mean numbers obtained by sequentially counting the intersections of cracks and line segments. The example shown in FIG. 3 is a square (4 mm×4 mm) soft magnetic ribbon for magnetic core and has cracks generated by a fragmentation treatment. In the figure, cracks are indicated by solid lines, and line segments are indicated by dotted lines.

The line segments extend in one direction (the horizontal direction in the figure) of the square soft magnetic ribbon for magnetic core. 10 line segments are drawn at equal intervals in parallel to a direction orthogonal to one direction (the vertical direction in the figure). At this time, the number of cracks intersecting the line segments is measured to obtain a total number of cracks intersecting the line segments, and the total length of the line segments divided by the total number is defined as an average crack interval represented by Formula (1).

Average Crack Interval [mm]=(Total Length of Line Segments)/(Total Number of Cracks Intersecting Line Segments) (1)

If the example shown in FIG. 3 is applied to Formula (1), the average crack interval is 40/46 [mm] and about 0.87 mm as the total number of cracks intersecting the line segments is 46, and the total length of the line segments is 40 mm.

The average crack interval varies depending on a selected area and is thereby preferably averaged by calculation in a plurality of areas. Moreover, it is preferable to decide how to select the areas. For example, when the ring-shaped soft magnetic ribbon 10 is used as the present embodiment, the areas can be selected to include a center line A of the ring area in calculating the average crack interval.

Preferably, each of the soft magnetic ribbons is fragmented so that the average crack interval is 0.015 mm or more and 1 mm or less. When the average crack interval is smaller than 0.015 mm, the magnetic permeability of the soft magnetic ribbons is too low, and the performance of the magnetic core is low. When the average crack interval is larger than 1 mm, it is difficult to punch the soft magnetic ribbons with a weak force, and the stress generated on the cut surface in the punching reaches widely. This reduces the effect of fragmentation.

The soft magnetic ribbon for magnetic core is made of a known material, such as a magnetic alloy (e.g., an amorphous alloy, a microcrystalline alloy, a permalloy, an alloy having a nanohetero structure). Examples of the amorphous alloy material include Fe based amorphous soft magnetic materials and Co based amorphous soft magnetic materials. Examples of the microcrystalline alloy include Fe based nanocrystalline soft magnetic materials. The nanohetero structure means a structure in which microcrystals exist in amorphous phase.

Preferably, a composition of the Fe based nanocrystalline soft magnetic material is represented by a composition formula of $(Fe_{(1-(\alpha+\beta))}X1_{\alpha}X2_{\beta})_{(1-(a+b+c+d+e+f))}M_aB_bP_cSi_dC_eS_f$, where X1 is one or more selected from Co and Ni, X2 is one or more selected from Al, Mn, Ag, Zn, Sn, As, Sb, Cu, Cr, Bi, N, O, and rare earth elements, and M is one or more selected from Nb, Hf, Zr, Ta, Mo, V, and W, $0 \le a \le 0.140$, $0.020 < b \le 0.200$, $0 \le c \le 0.150$, $0 \le d \le 0.180$, $0 \le e < 0.040$, $0 \le f \le 0.030$, $\alpha \ge 0$, $\beta \ge 0$, and $0 \le \alpha+\beta \le 0.50$ are satisfied, and one or more of a, c, and d are larger than zero.

Preferably, the volume ratio (space factor) of the magnetic material in the magnetic core is 70% or more and 99.5% or less. In each of the soft magnetic ribbons, when the space factor of the magnetic material is 70% or more, the saturation magnetic flux density can be sufficiently high, and the soft magnetic ribbons can be effectively used for the magnetic core. In each of the soft magnetic ribbons, when the space factor of the magnetic material is 99.5% or less, the magnetic core is hard to be broken and is handled easily.

FIG. 1 illustrates a cylindrical magnetic core, but the magnetic core of the present invention has any shape and, for example, may have the following shape.

Modified Example 1

Figure 4:
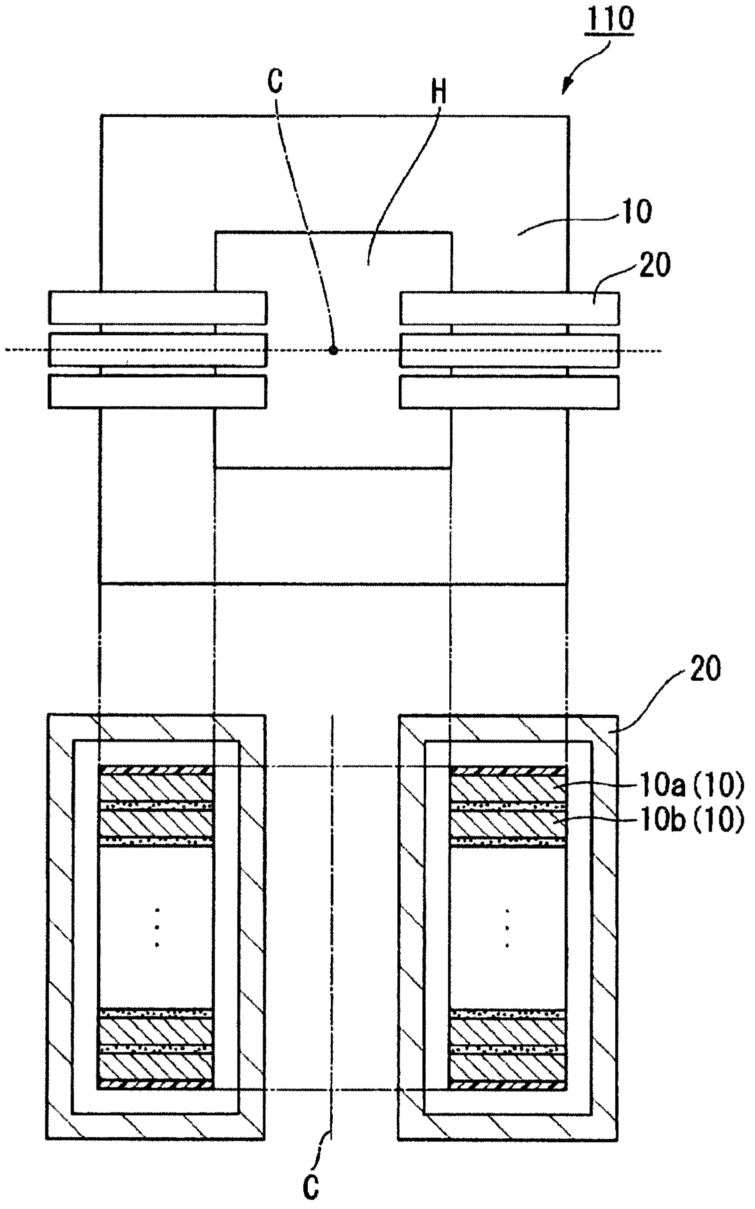
FIG. 4 is a plane view of a coil device according to Modified Example 1 of the present invention.

FIG. 4 illustrates a configuration of a coil device 110 according to Modified Example 1 of the present embodiment. The magnetic core 10 has a rectangular cylindrical shape. The coil device 110 is formed by winding a spiral coil 20 along a circumferential direction of a through hole H at two locations of the lateral wall surrounding the through hole H of the magnetic core 10. The upper side of FIG. 4 is a plane view of the coil device 110 viewed from one side where the central axis C of the rectangular cylindrical magnetic core 10 is extended. The lower side of FIG. 4 is a cross-sectional view of the coil device 110 cut along a plane including the central axis C. The back of the cross section is not illustrated. The same portions as the present embodiment are given the same reference numerals regardless of the difference in shape. The configuration of Modified Example 1 can also demonstrate effects similar to those of the above-mentioned embodiment.

Modified Example 2

Figure 5:
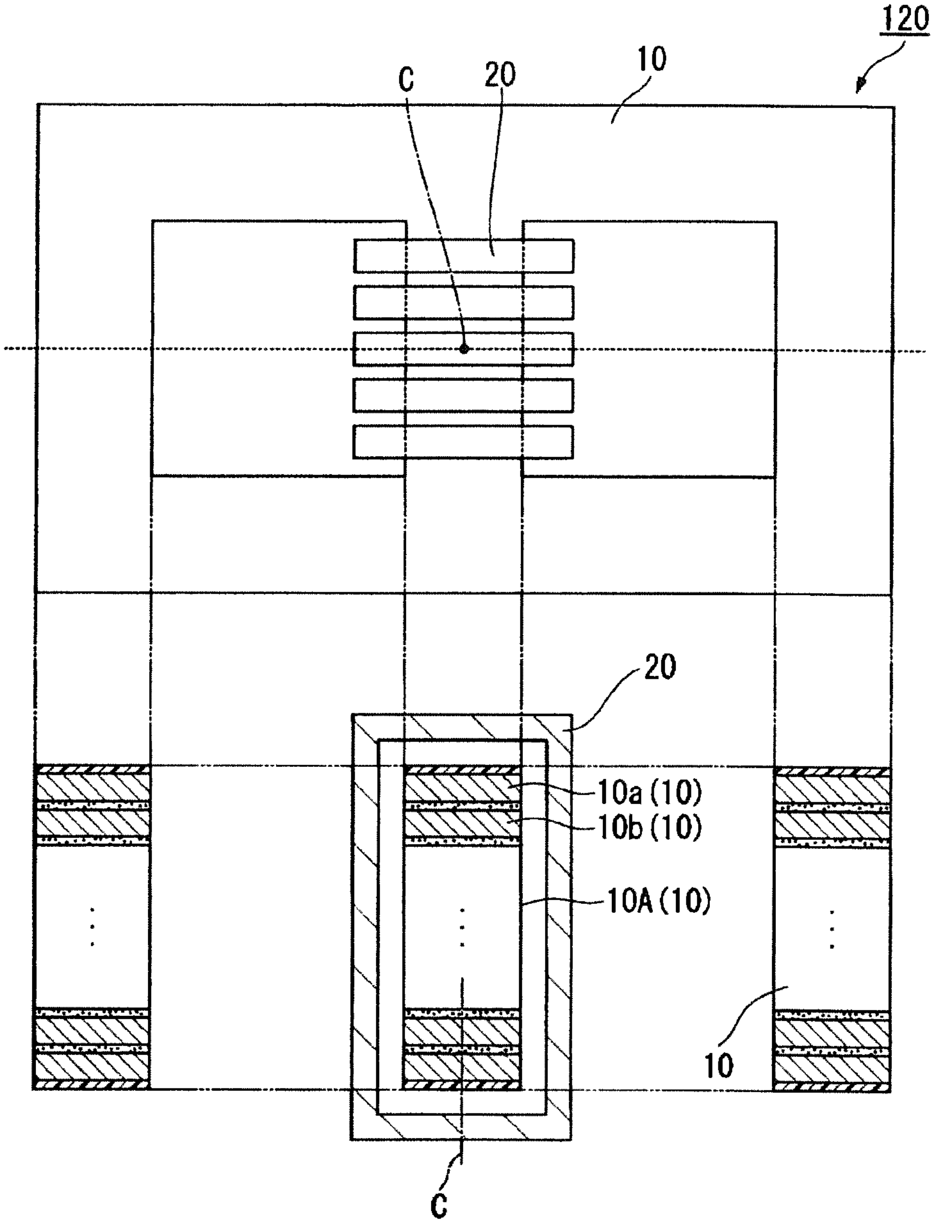
FIG. 5 is a plane view of a coil device according to Modified Example 2 of the present invention.

FIG. 5 illustrates a configuration of a coil device 120 according to Modified Example 2 of the present embodiment. The magnetic core 10 has a rectangular cylindrical shape and contains a partition portion 10A. The partition portion 10A divides the inside of the rectangular cylinder into two sections. The coil device 120 is formed by winding a spiral core 20 around the partition portion 10A. The upper side of FIG. 5 is a plane view of the coil device 120 viewed from one side where the central axis C of the rectangular cylindrical part is extended. The lower side of FIG. 5 is a cross-sectional view of the coil device 120 cut along a plane including the central axis C. The back of the cross section is not illustrated. The same portions as the present embodiment are given the same reference numerals regardless of the difference in shape. The configuration of Modified Example 2 can also demonstrate effects similar to those of the above-mentioned embodiment.

Modified Example 3

Figure 6A:
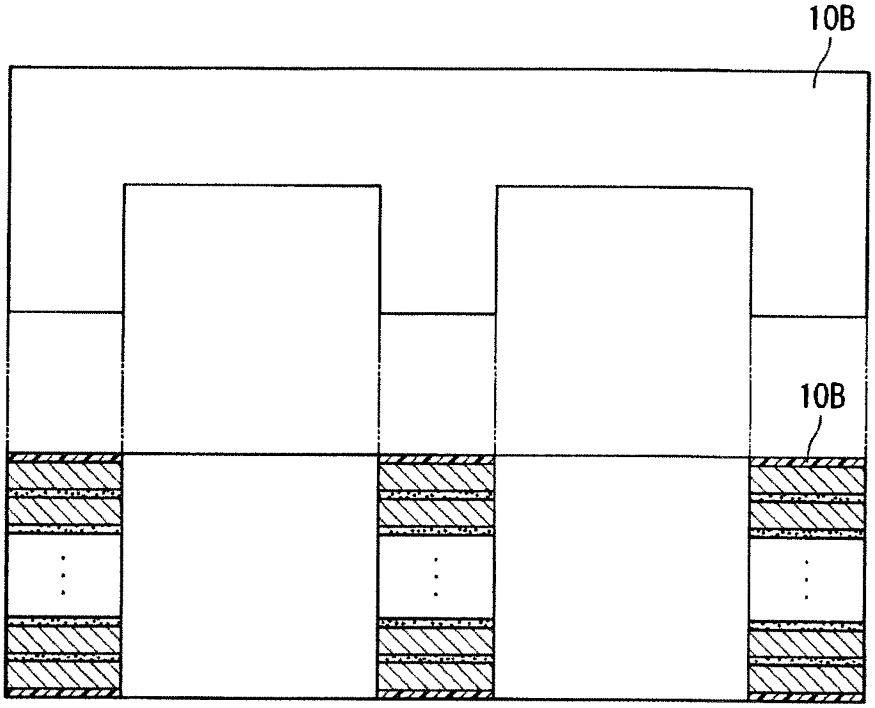
FIG. 6A is a plane view of a coil device according to Modified Example 3 of the present invention.
Figure 6B:
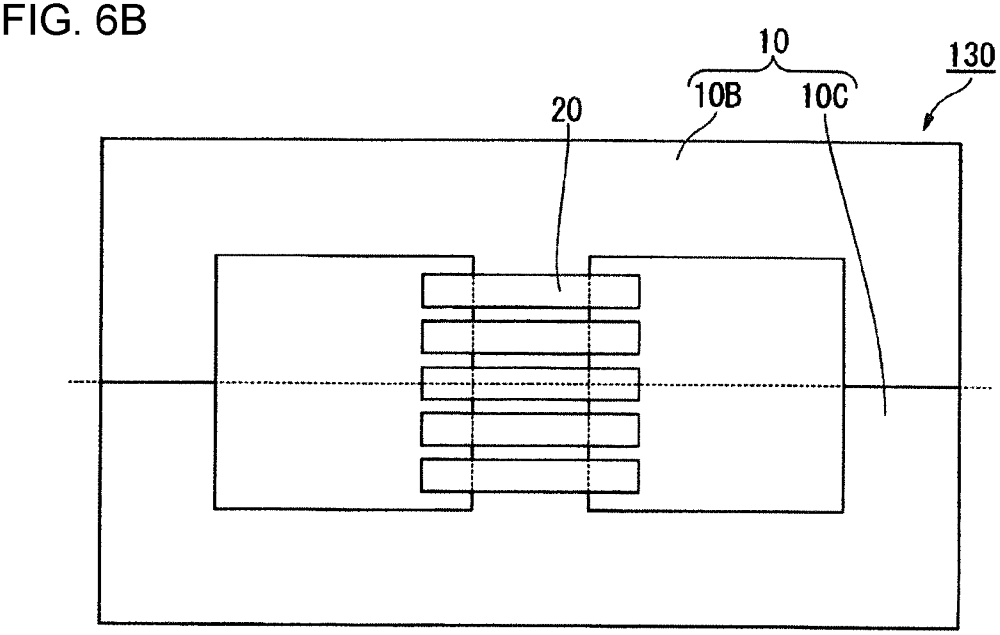
FIG. 6B is a plane view of a coil device according to Modified Example 3 of the present invention.

FIG. 6A and FIG. 6B illustrate a configuration of a coil device 130 according to Modified Example 3 of the present embodiment. The magnetic core 10 of the present example has a rectangular cylindrical shape and contains a partition portion 10A as with Modified Example 2 and has a configuration where the inside can be divided into two sections 10B and 10C. FIG. 6B is a plane view of the magnetic core 10 when the inside is not divided. FIG. 6A is a plane view and a cross-sectional view of the section 10B (one of the divided sections). The shape of each of the divided sections is not limited to one shown here. The same portions as the present embodiment are given the same reference numerals regardless of the difference in shape. The configuration of Modified Example 3 can also demonstrate effects similar to those of the above-mentioned embodiment.

[Method of Manufacturing Magnetic Core]

A method of manufacturing a magnetic core according to the present embodiment mainly includes a heat treatment step, an adhesive-layer formation step, a fragmentation step, a punching step, and a lamination step. The outline of each step is explained.

(Heat Treatment Step)

A plurality of soft magnetic ribbons mentioned above is prepared and subjected to a heat treatment. The treatment temperature is approximately 400° C. or higher and 700° C. or lower and is determined depending on the material of the soft magnetic ribbons. Due to the heat treatment, the soft magnetic ribbons become brittle and can be subjected to a fragmentation treatment. When the soft magnetic ribbons are made of an Fe based nanocrystalline type material, nanocrystals are deposited on the soft magnetic ribbons by the heat treatment. When the soft magnetic ribbons are made of an Fe based amorphous type material, the residual strain in the soft magnetic ribbons is removed by the heat treatment.

(Adhesive-Layer Formation Step)

The above-mentioned adhesive layer is formed on each of the soft magnetic ribbons subjected to the heat treatment. The adhesive layer can be formed using a known method. For example, the adhesive layer is formed by thinly applying a solution containing a resin to the soft magnetic ribbons and drying the solvent. In addition, a double-sided tape may be adhered to the soft magnetic ribbons as an adhesive layer. For example, the double-sided tape is a polyethylene terephthalate (PET) film whose both surfaces are coated with an adhesive.

(Fragmentation Treatment Step)

Each of the multiple soft magnetic ribbons with the adhesive layers is divided into a plurality of small pieces (fragmentation treatment) so that the average crack interval is in the above-mentioned range. Since the adhesive layers are formed, it is possible to prevent the divided small pieces from being scattered. That is, each of the soft magnetic ribbons after the fragmentation treatment is divided into a plurality of small pieces, but the locations of all of the small pieces are fixed via the adhesive layers, and the shape before the fragmentation treatment is substantially maintained as a whole.

The fragmentation treatment can be carried out using a known method, that is, a division method with application of external force. As the division method with application of external force, for example, known are a method of pressing with a mold, a method of bending through a rolling roller, and the like. When these methods are used, the mold and the roller may be provided with a predetermined uneven pattern.

(Punching Step)

Each of the multiple fragmented soft magnetic ribbons is punched into a predetermined shape together with the adhesive layers. The present embodiment exemplifies a case where the center is punched into a circular shape. For example, the punching can be performed by sandwiching the soft magnetic ribbons between a punching die having a desired shape and a facing plate and pressurizing them from the facing plate to the punching die or from the punching die to the facing plate.

(Lamination Step)

The magnetic core according to the present embodiment can be obtained by laminating the multiple punched soft magnetic ribbons in the thickness direction via the adhesive layers. Incidentally, the order of the punching step and the lamination step may be reversed.

As mentioned above, the soft magnetic ribbons M for the magnetic core 10 in the coil device 100 of the present embodiment are made of a hard material as mentioned above, but are each divided into a plurality of small pieces and can be punched with a weak force compared to when not divided. Therefore, the magnetic core 10 according to the present embodiment is easily processed into a desired shape and is excellent in productivity.

In general, when a soft magnetic ribbon is punched, a stress is generated by cutting a punched portion and a remaining portion are cut, and the stress is transmitted to the remaining portion of the soft magnetic ribbon to deteriorate the magnetic characteristics. However, each of the soft magnetic ribbons M according to the present embodiment is fragmented and has a physical distance between the portion near the cut surface where the stress is generated and the other portion. Thus, the stress is not transmitted to most part other than the portion near the cut surface, and the damage caused by the stress can be minimized. Thus, the soft magnetic ribbons M of the present embodiment are stable magnetic characteristics without being affected by punching.

The magnetic core 10 according to the present embodiment has a structure in which the space factor of the magnetic material is increased by laminating a plurality of soft magnetic ribbons and is strong and easy to handle.

Since the magnetic core 10 of the present embodiment is formed by laminating a plurality of soft magnetic ribbons M, the current path is divided at a plurality of locations in the lamination direction T. In addition, since each of the soft magnetic ribbons M is fragmented, the current path is also divided at a plurality of locations in a direction intersecting the lamination direction T. Therefore, the eddy current path accompanying the change of the magnetic flux in the alternating magnetic field is divided in all directions, and the coil device 100 of the present embodiment can greatly reduce the eddy current loss.

EXAMPLES

Example 1

1. Manufacture of Magnetic Core (1) First, a resin solution was applied to Fe based nanocrystalline soft magnetic ribbons each having a thickness of about 20 μm and being previously subjected to a heat treatment at 570° C. After that, the solvent was dried, and adhesive layers of about 1-2 μm were formed on both surfaces of each of the soft magnetic ribbons to manufacture magnetic sheets provided with the adhesive layers.

(2) Next, the manufactured magnetic sheets were subjected to a fragmentation treatment in which the fragmentation size was adjusted so that the average crack interval would be 0.17 mm, and fragmented magnetic sheets were manufactured.

(3) Next, the fragmented magnetic sheets were punched into a ring shape (outer diameter: 18 mm, inner diameter: 10 mm). This punching was performed by sandwiching each of the fragmented magnetic sheets between a punching die and a facing plate and applying pressure from the facing plate to the punching die.

(4) Next, a magnetic core was obtained by laminating a plurality of punched-out fragmented magnetic sheets so as to have a height of about 5 mm. The space factor of the obtained magnetic core was about 85%. 30 magnetic cores having the same configuration were manufactured in a similar procedure.

2. Evaluation (1) Coil Inductance Ls 30 coil devices were formed by winding a coil along the circumference direction around each of the obtained magnetic cores as shown in FIG. 1, and an inductance of each of the coils at 100 kHz was measured using an LCR meter.

(2) Cv Value (Standard Deviation/Average Value)

A cv value was calculated for the measured inductance of each of the 30 coils.

Example 2

The magnetic cores of Example 2 were manufactured and evaluated as with Example 1 except that the magnetic sheets were subjected to a fragmentation treatment so that the average crack interval would be 0.5 mm.

Example 3

The magnetic cores of Example 3 were manufactured and evaluated as with Example 1 except that the magnetic sheets were subjected to a fragmentation treatment so that the average crack interval would be 0.015 mm.

Example 4

The magnetic cores of Example 4 were manufactured and evaluated as with Example 1 except that the magnetic sheets were subjected to a fragmentation treatment so that the average crack interval would be 0.01 mm.

Example 5

The magnetic cores of Example 5 were manufactured and evaluated as with Example 1 except that the magnetic sheets were subjected to a fragmentation treatment so that the average crack interval would be 0.75 mm.

Example 6

The magnetic cores of Example 6 were manufactured and evaluated as with Example 1 except that the soft magnetic ribbons made of Fe based amorphous soft magnetic material were employed.

Example 7

The magnetic cores of Example 7 were manufactured and evaluated as with Example 1 except that the magnetic sheets were subjected to a fragmentation treatment so that the average crack interval would be 1 mm.

Example 8

The magnetic cores of Example 8 were manufactured and evaluated as with Example 1 except that the magnetic sheets were subjected to a fragmentation treatment so that the average crack interval would be 2 mm.

Comparative Example 1

The same evaluation as in Example 1 was performed on magnetic sheets that were not subjected to the heat treatment or the fragmentation treatment. Except for the heat treatment and the fragmentation treatment, the same procedure as in Example 1 was performed.

Comparative Example 2

The same evaluation as in Example 1 was performed on magnetic sheets that were not subjected to the fragmentation treatment. Except for the fragmentation treatment, the same procedure as in Example 1 was performed.

Table 1 summarizes the measurement results and evaluation results of Examples 1-8 and Comparative Examples 1 and 2. In any of Examples 1-8, the soft magnetic ribbons were fragmented and thereby able to be punched with a weak force. In any of Examples 1-8, since the stress generated in the vicinity of the cross section at the punching was difficult to travel to the inside, the deterioration of magnetic characteristics (decrease in inductance Ls) was restrained. In particular, the cv value of inductance was low in the range where the average crack interval was 0.015 mm or more and 1 mm or less.

In Comparative Example 1, since the soft magnetic ribbons were not subjected to the heat treatment or the fragmentation treatment, it was difficult to punch the magnetic sheets with a force similar to that of Examples 1-8, and inductance could not be measured. In Comparative Example 2, since the magnetic sheets were not fragmented though being able to be punched with a force similar to that of Examples 1-8 by carrying out the heat treatment, the stress generated by punching was transmitted to a wide range of the soft magnetic ribbons and deteriorated the cv value of inductance.

TABLE 1

| | Magnetic Material | Heat Treatment | Fragmentation | Average Crack Interval (mm) | Punching Possibility | Ls (μ H) | cv Value (%) |
|---|---|---|---|---|---|---|---|
| Ex. 1 | Fe based nanocrystalline type ribbons | yes | yes | 0.17 | possible | 360 | 1.4 |
| Ex. 2 | Fe based nanocrystailine type ribbons | yes | yes | 0.5 | possible | 600 | 1.7 |
| Ex. 3 | Fe based nanocrystsiline type ribbons | yes | yes | 0.015 | possible | 33 | 1.5 |
| Ex. 4 | Fe based nanocrystalline type ribbons | yes | yes | 0.01 | possible | 20 | 5.0 |
| Ex. 5 | Fe based nanocrystalline type ribbons | yes | yes | 0.75 | possible | 700 | 2.9 |
| Ex. 6 | Fe based amorphous type ribbons | yes | yes | 0.5 | possible | 120 | 5.0 |
| Ex. 7 | Fe based nanocrystalline type ribbons | yes | yes | 1 | possible | 1000 | 3.5 |
| Ex. 8 | Fe based nanocrystalline type ribbons | yes | yes | 2 | possible | 1350 | 4.0 |
| Comp. Ex. 1 | Fe based nanocrystalline type ribbons | no | no | — | impossible | — | — |
| Comp. Ex. 2 | Fe based nanocrystalline type ribbons | yes | no | — | possible | 2500 | 12.0 |

Example 9

The magnetic cores of Example 9 were manufactured and evaluated as with Example 1 except that the space factor of the soft magnetic ribbons was 98% by adjusting the thickness of each of the adhesive layers.

Comparative Example 3

Cylindrical magnetic cores made of the same material and size as those of the magnetic cores of Example 1 were manufactured as Comparative Example 3. These magnetic cores were not a laminate of a plurality of soft magnetic ribbons, but cores manufactured by winding a soft magnetic ribbon. The magnetic cores were evaluated similarly to Example 1.

Table 2 summarizes the measurement results and evaluation results of Examples 8 and 9 and Comparative Example 3. The multilayer cores of Examples 8 and 9 had a high inductance and a small cv value. In contrast, the winding cores of Comparative Example 3 had a lower inductance and a higher cv value than those of Examples 8 and 9. This is because, compared to the multilayer core, the winding core is easy to have a gap as its cylindrical shape formed by winding the soft magnetic ribbon and had a low space factor, and the winding core is easily affected by irregularity of the winding and had a large cv value.

TABLE 2

| | Shape | Space Factor (%) | Ls (μ H) | cv Value (%) |
|---|---|---|---|---|
| Ex. 8 | multilayer cores | 85 | 1350 | 4.0 |
| Ex. 9 | multilayer cores | 98 | 1550 | 4.5 |
| Comp. Ex. 3 | winding core | 69 | 1270 | 10 |

NUMERICAL REFERENCES

100, 110, 120 . . . coil device
10 . . . magnetic core
20 . . . coil
3*a*, 3*b* . . . protective film
A . . . center line
C . . . central axis
H . . . through hole
M (10*a*-10*j*) . . . soft magnetic ribbon
R . . . region
S (2*a*-2*i*) . . . adhesive layer
T . . . lamination direction

The invention claimed is:

1. A magnetic core for a coil device including a conductor, comprising laminated soft magnetic ribbons which are fragmented so as to have an average crack interval of 0.17 mm or more and 0.5 mm or less, and the soft magnetic ribbons are Fe based nanocrystalline soft magnetic ribbons.

2. The magnetic core according to, claim 1, wherein a space factor of a magnetic material in the magnetic core is 70% or more and 99.5% or less.

3. A coil device comprising the magnetic core according to claim 1 wound by a coil.

4. A method of manufacturing the magnetic core according to claim 1, comprising the steps of:

heating a plurality of soft magnetic ribbons;

forming an adhesive layer on a main surface of each of the heated soft magnetic ribbons;

fragmenting each of the soft magnetic ribbons on which the adhesive layer is formed;

punching each of the fragmented soft magnetic ribbons into a predetermined shape; and laminating the fragmented soft magnetic ribbons via the adhesive layer in a thickness direction.

* * * * *